United States Patent
Herth

(10) Patent No.: US 7,554,032 B2
(45) Date of Patent: *Jun. 30, 2009

(54) ELECTRICAL BOX WITH MULTI-MOUNT FEATURES

(76) Inventor: Greg Herth, 10 Tower Mews, P.O. Box 507, Oakdale, NY (US) 11769-2420

( * ) Notice: Subject to any disclaimer, the term of this patent is extended or adjusted under 35 U.S.C. 154(b) by 0 days.

This patent is subject to a terminal disclaimer.

(21) Appl. No.: 11/897,745

(22) Filed: Aug. 31, 2007

(65) Prior Publication Data

US 2008/0142241 A1    Jun. 19, 2008

(51) Int. Cl.
H02G 3/08 (2006.01)

(52) U.S. Cl. .............................. 174/50; 174/58; 174/64; 439/535; 248/906

(58) Field of Classification Search ............... 174/50, 174/57, 58, 60, 64, 17, 135; 220/3.4, 3.5, 220/3.3, 3.6, 3, 9; 439/535; 248/906; 33/528
See application file for complete search history.

(56) References Cited

U.S. PATENT DOCUMENTS

| | | |
|---|---|---|
| 1,133,946 A | 3/1915 | Farrell |
| 2,730,261 A | 1/1956 | Tutt |
| 2,757,817 A | 8/1956 | Egan |
| 3,895,732 A | 7/1975 | Robinson et al. |
| 4,214,668 A | 7/1980 | Neff et al. |
| 4,297,525 A | 10/1981 | Bowden, Jr. |
| 4,328,903 A | 5/1982 | Baars |
| 4,424,406 A | 1/1984 | Slater et al. |
| 4,436,952 A | 3/1984 | Lockwood |
| 4,673,097 A | 6/1987 | Schuldt |
| 4,757,158 A | 7/1988 | Lentz |
| 4,788,383 A | 11/1988 | Caison |
| 4,936,794 A | 6/1990 | Shaw et al. |
| 5,378,854 A | 1/1995 | Hoover |
| 5,448,012 A | 9/1995 | Jacob |
| 5,596,174 A | 1/1997 | Sapienza |
| 5,600,093 A | 2/1997 | Herth et al. |
| 5,603,424 A | 2/1997 | Bordwell et al. |
| 5,833,110 A | 11/1998 | Chandler et al. |
| 6,100,469 A | 8/2000 | Jorgensen et al. |
| 6,278,058 B1 | 8/2001 | Anderson |
| 6,342,675 B1 | 1/2002 | DeBartolo, Jr. et al. |
| D461,455 S | 8/2002 | Forbes |
| 6,573,446 B1 | 6/2003 | Umstead et al. |
| 6,632,998 B1 | 10/2003 | Gretz |
| 6,642,446 B2 | 11/2003 | Dodds et al. |
| 6,756,541 B1 | 6/2004 | Mollick et al. |
| 6,800,806 B1 | 10/2004 | Grday |

(Continued)

*Primary Examiner*—Dhiru R Patel
(74) *Attorney, Agent, or Firm*—Alfred M. Walker

(57) ABSTRACT

A multi-mount, multi-use commercial line electrical box includes first and second side walls, lower and upper walls forming a front opening into the electrical box, and a rear wall. The first side wall has one or more removable external flanges, each flange having a front surface flush with an edge of the front opening for accommodating one or more fasteners. The second side wall also has one or more removable external flanges for accommodating one or more fasteners. A slide-in plate is mounted in side recesses along an inner surface of one of the side walls. The slide-in plate has one or more angled screw guides for a fastener in registry with an exit hole in one of the side walls. One of said lower and upper walls accommodates external attachment nails.

6 Claims, 13 Drawing Sheets

U.S. PATENT DOCUMENTS

| | | |
|---|---|---|
| 6,831,228 B2 * | 12/2004 | Lalancette et al. ............ 174/58 |
| 6,858,802 B2 | 2/2005 | Hagarty et al. |
| 6,909,045 B2 | 6/2005 | Halbert |
| 6,956,168 B2 | 10/2005 | Herth |
| 6,997,747 B1 | 2/2006 | Norte et al. |
| 7,214,875 B1 | 5/2007 | Gretz |
| 7,307,212 B1 | 12/2007 | Gretz |
| 7,307,213 B1 | 12/2007 | Gretz |

* cited by examiner

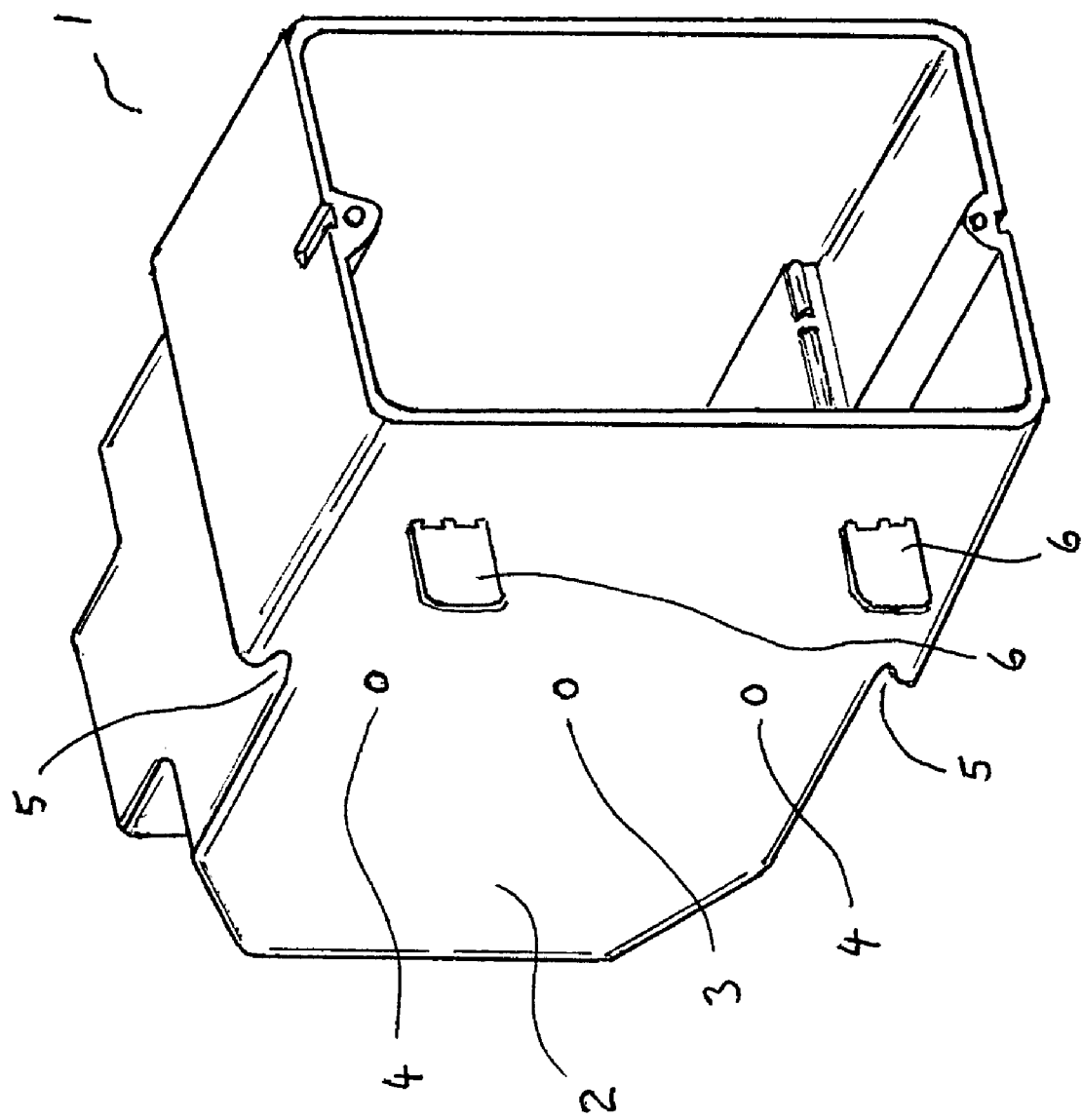

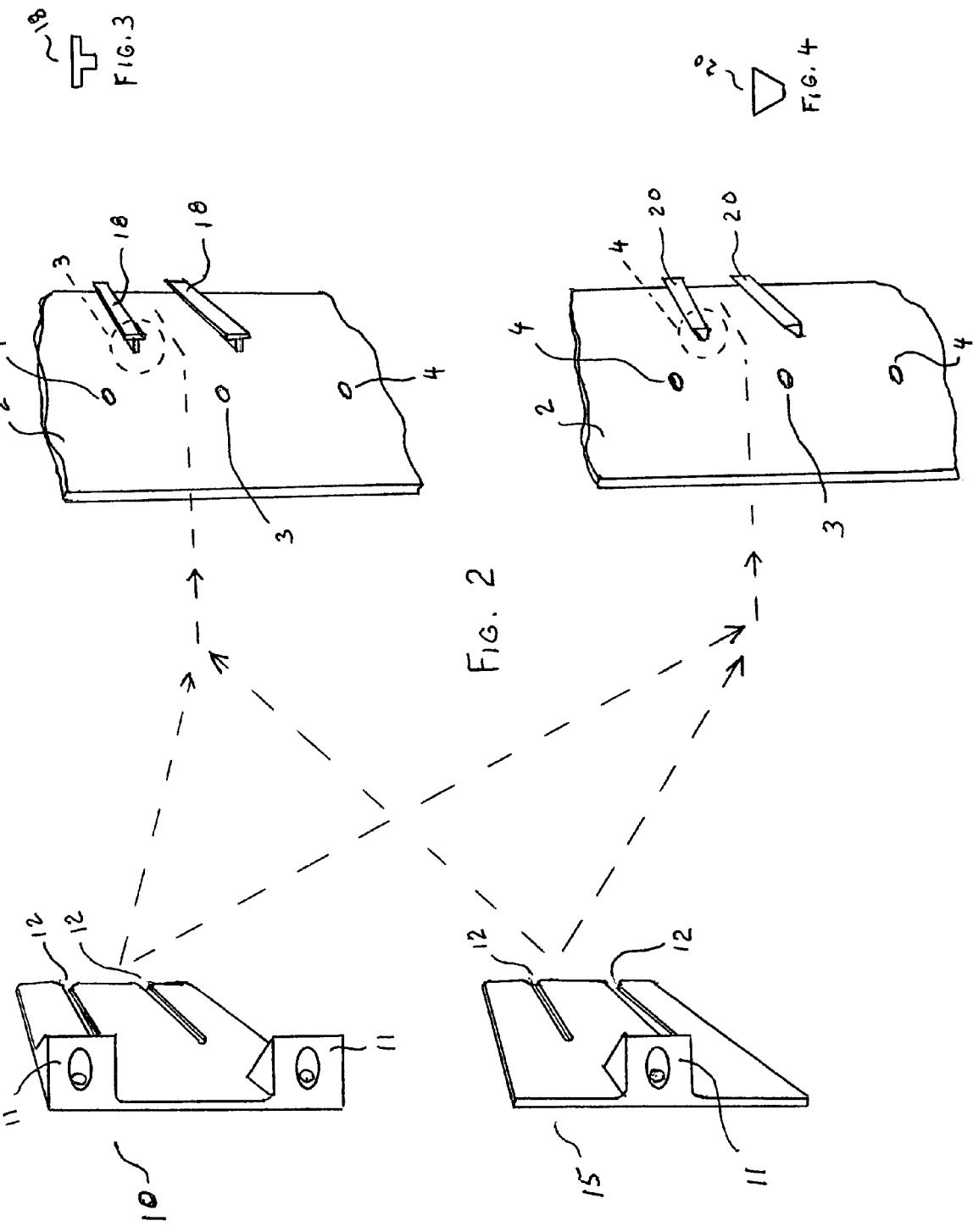

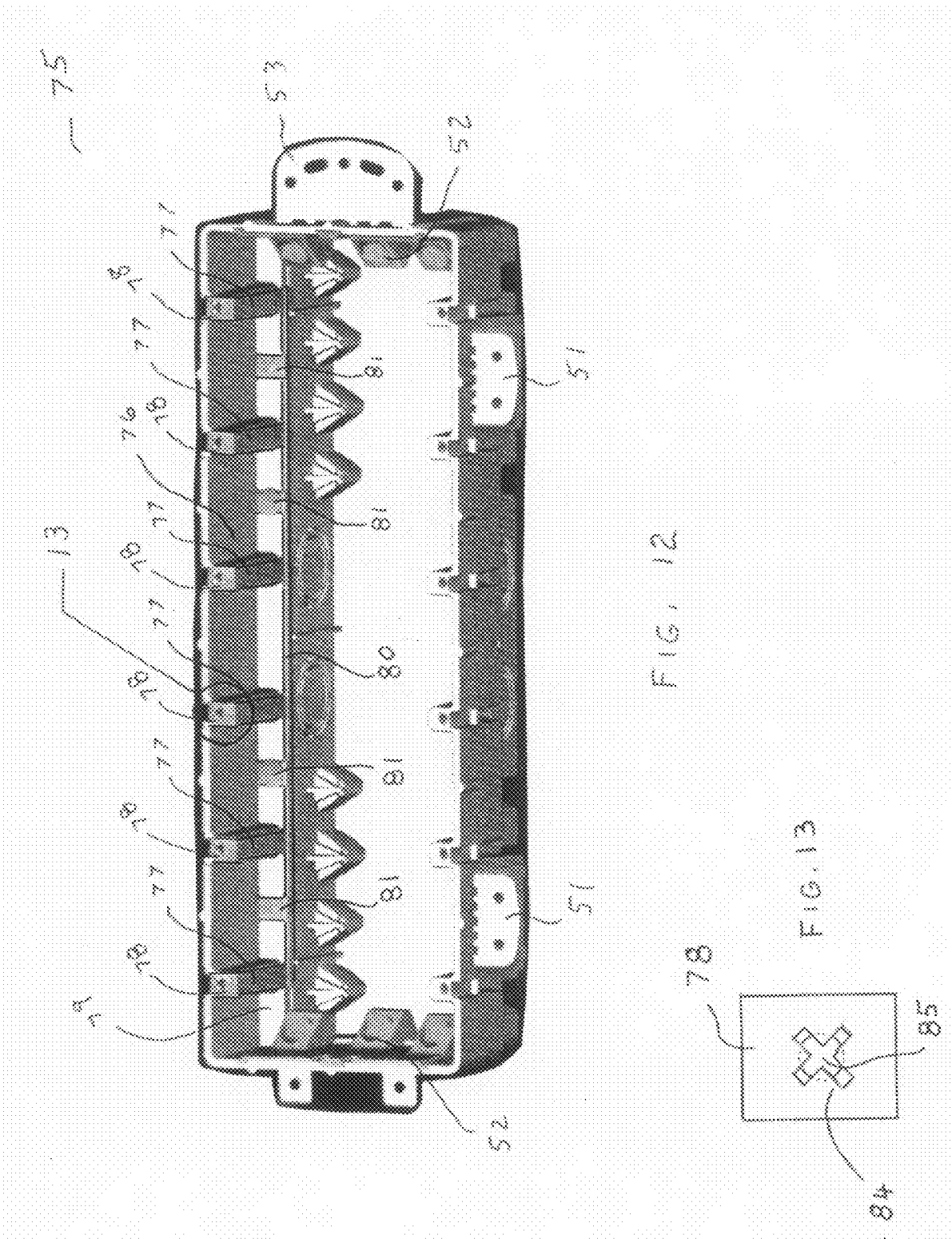

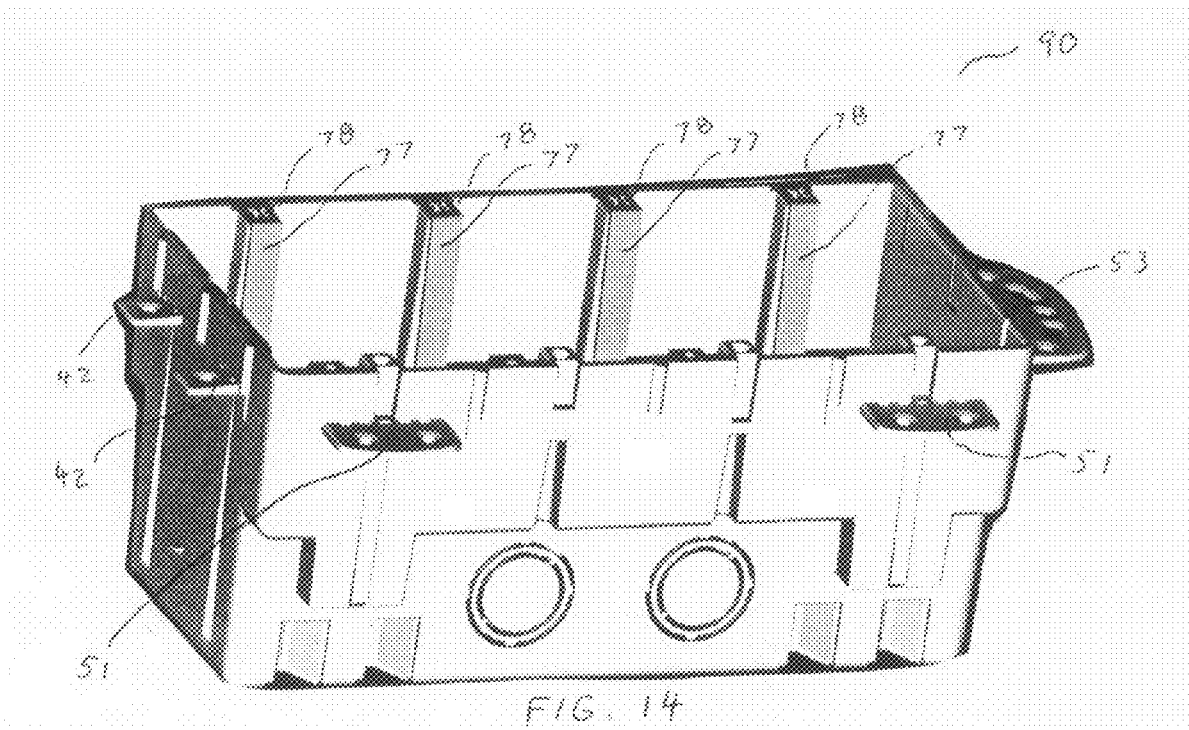

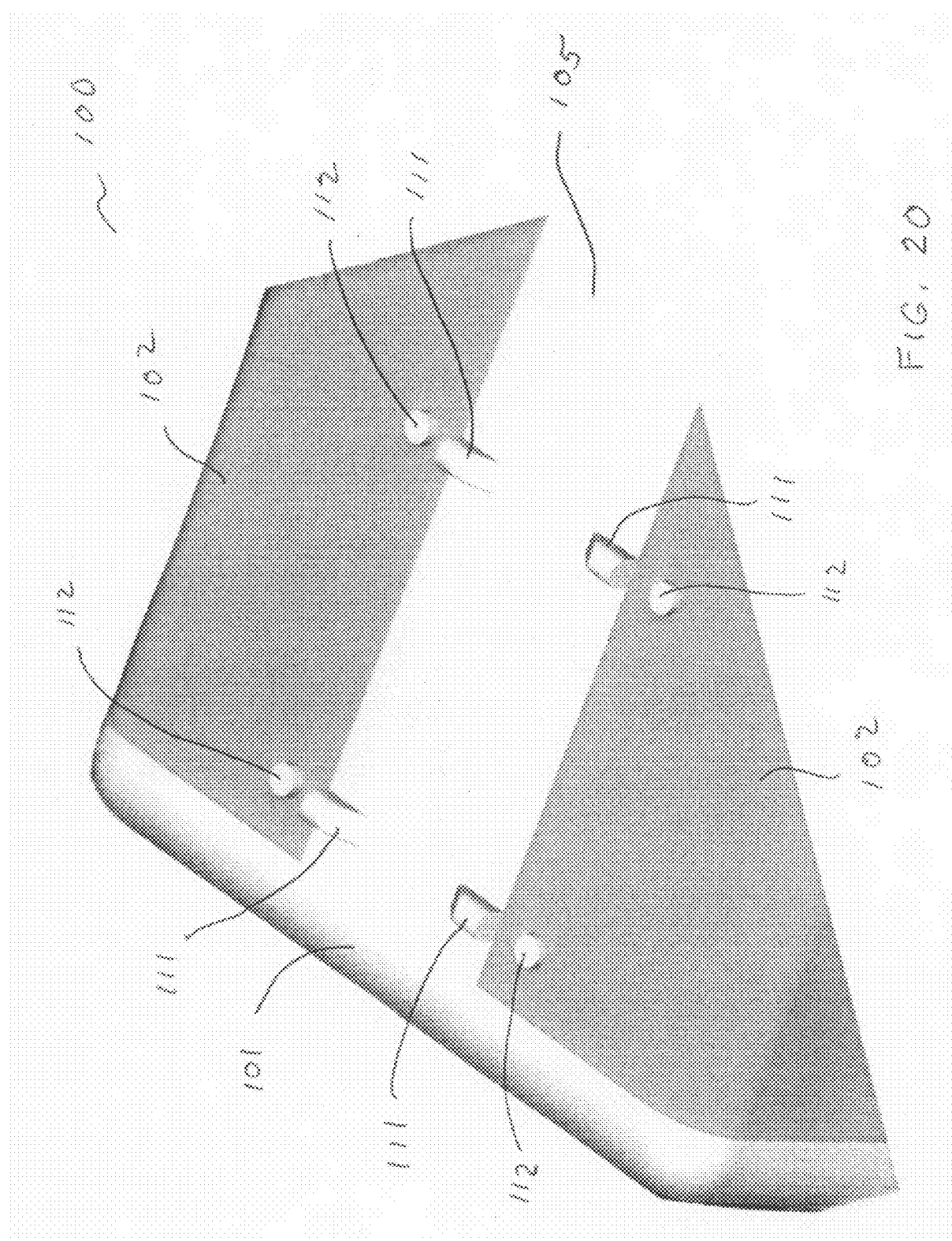

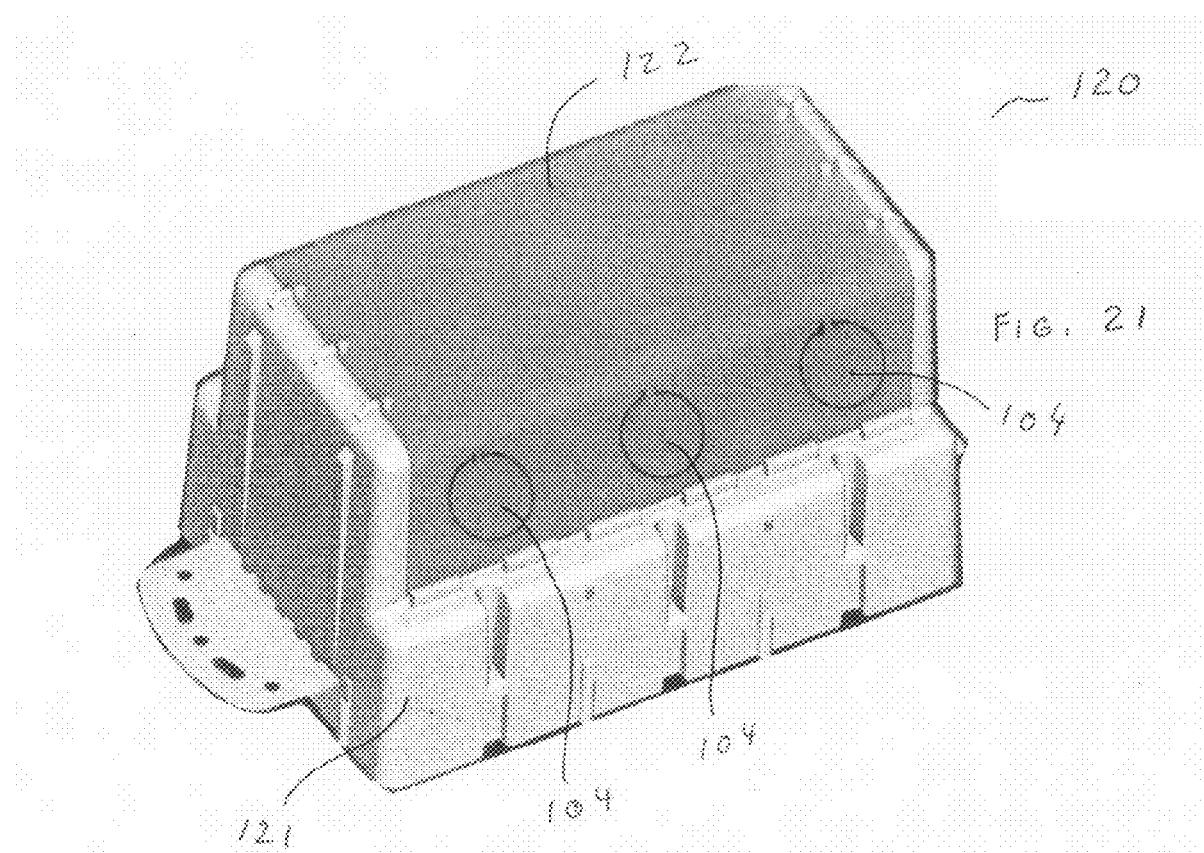
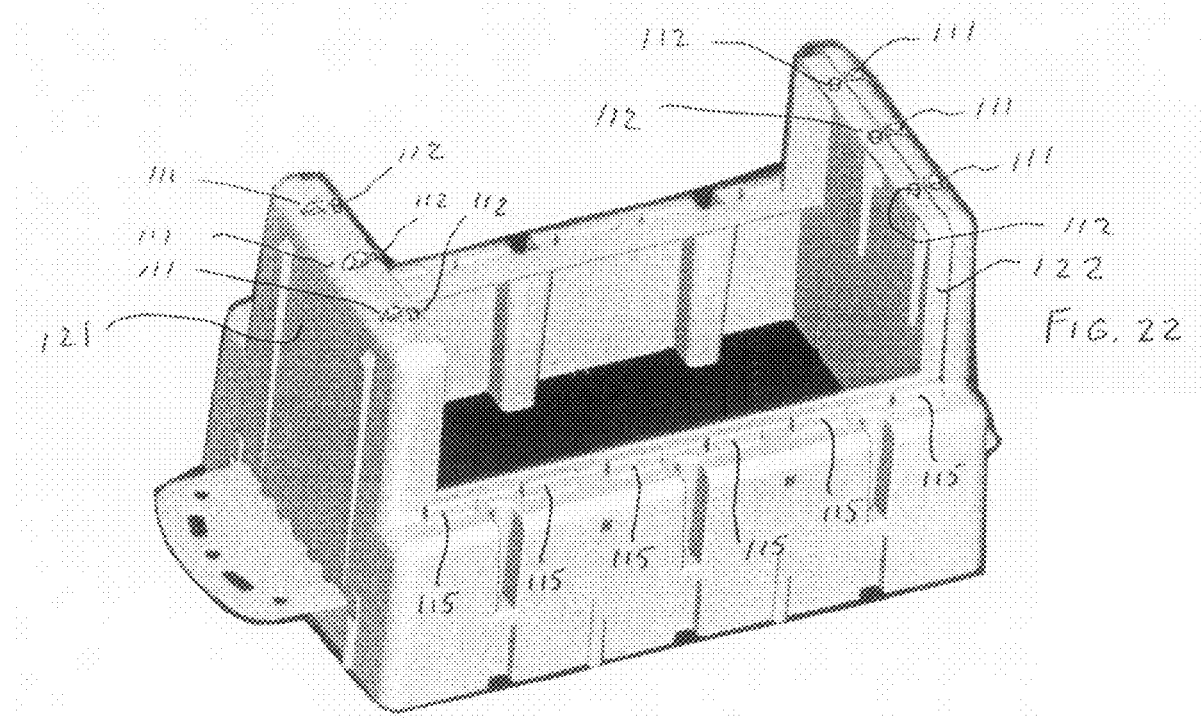

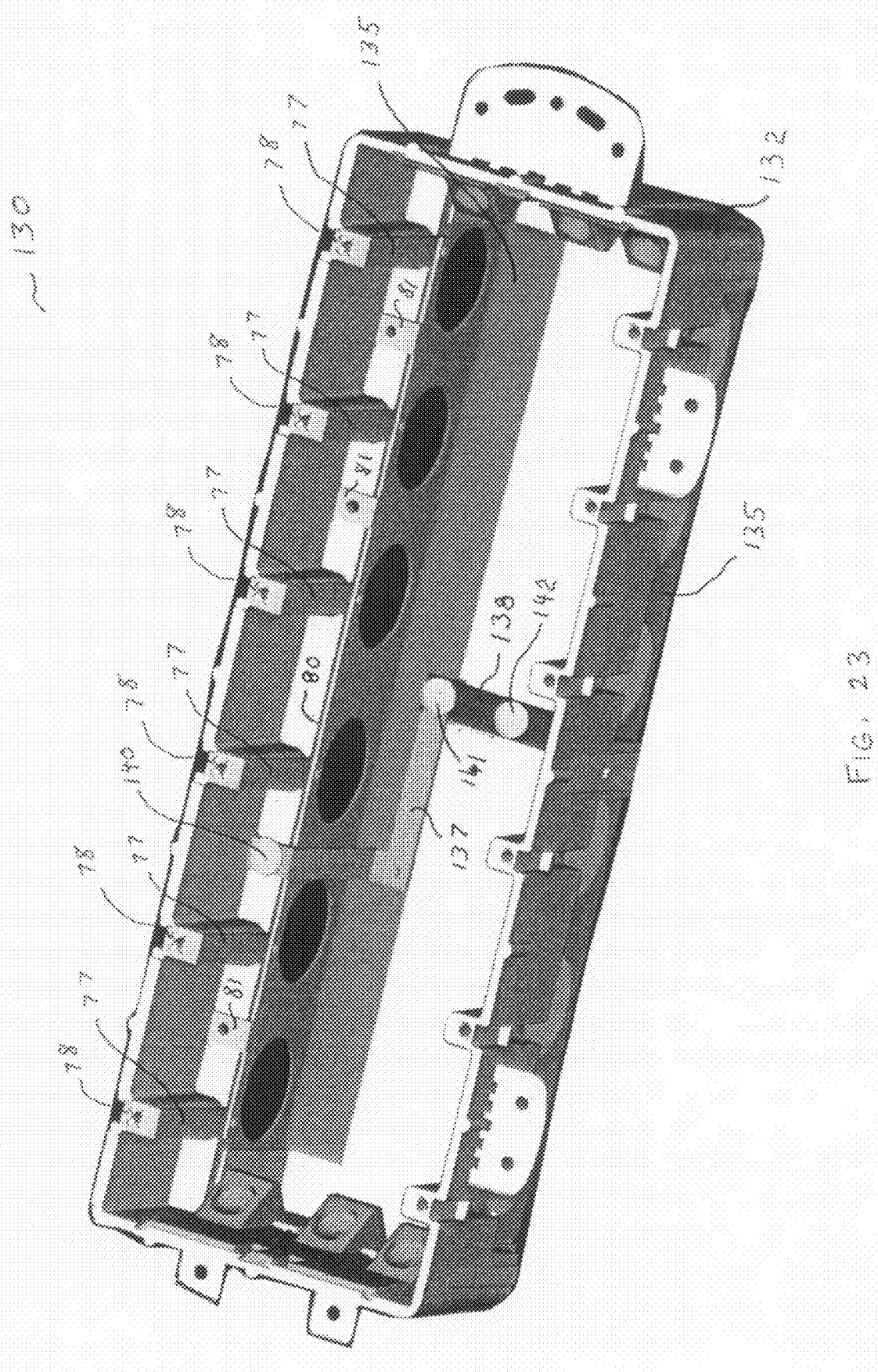

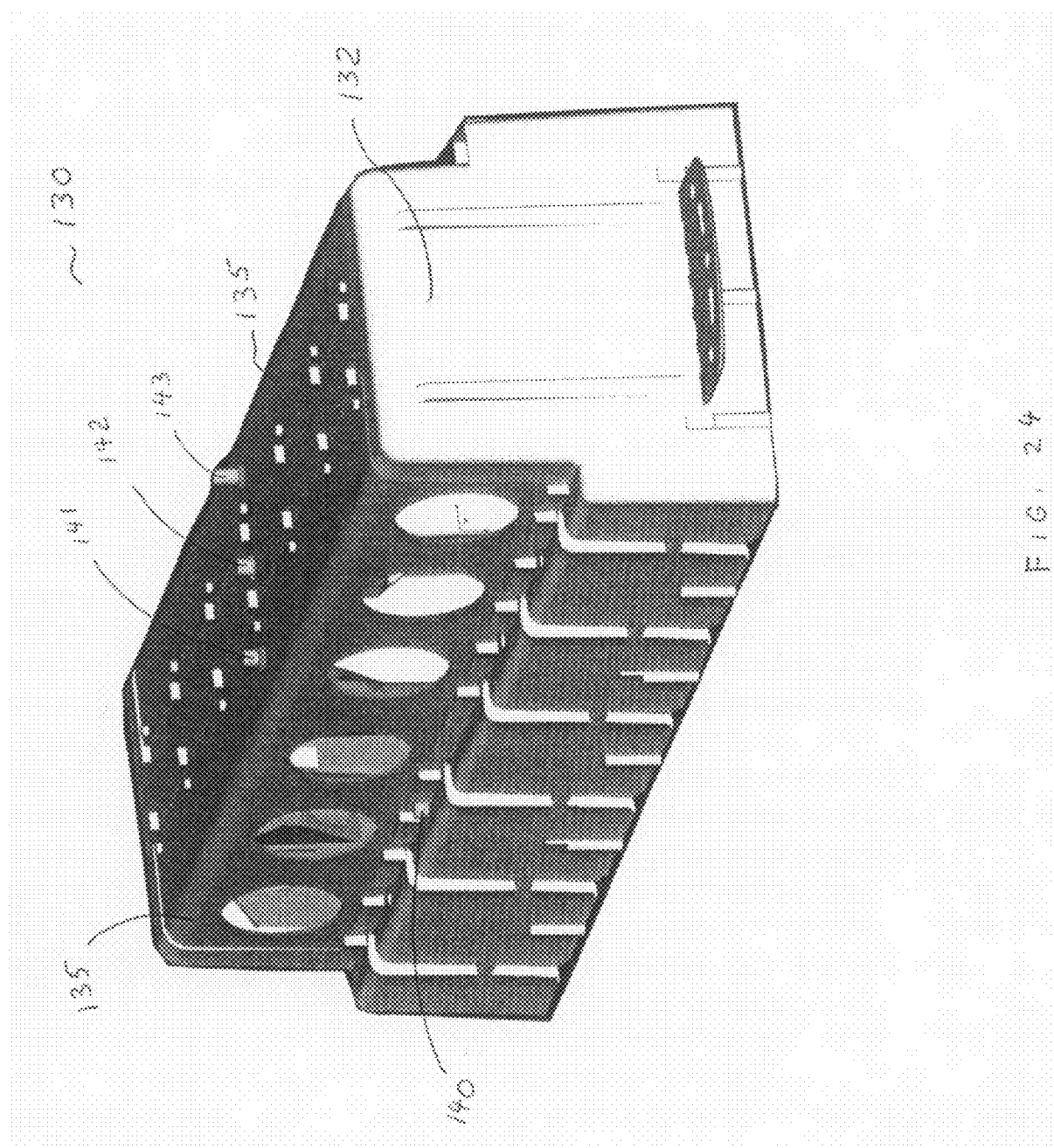

ELECTRICAL BOX WITH MULTI-MOUNT FEATURES

FIELD OF THE INVENTION

The present invention relates to adaptable electrical boxes with multiple uses.

BACKGROUND OF THE INVENTION

Molded electrical boxes designed for nail attachment to wooden beams or studs are well known in the industry. Molded electrical boxes with internal screw attachment are known in the prior art. U.S. Pat. No. 5,600,093 of Herth et al. describes such a dual purpose electrical box which is attached by two internal screws; it is especially convenient to use for old work. A pending application of Herth describes an electrical box for single fastener attachment using a single internal screw; for new work, two anti-rotation and positioning tabs are molded onto the mounting side of the box. The prior art does not reveal molded electrical boxes equipped with features permitting the three different types of attachment methods described above.

OBJECTS OF THE INVENTION

It is therefore an object of the present invention to provide an adaptable electrical box with multiple attachment locations for multiple uses.

It is also an object of this invention to improve over the disadvantages of the prior art.

SUMMARY OF THE INVENTION

In keeping with these objects and others which may become apparent, this invention is a molded electrical box with features which make it adaptable to external nail attachment to a beam or stud as well as either single or dual internal screw attachment. The electrical box is usable for new work or for old work where the internal screw feature permits convenient attachment through a hole in the wall surface adjacent to a stud that is sized to the perimeter of the box. Resetting of the box to accommodate a modification of a wall surface which affects the thickness of the wall covering is also facilitated by the internal screw features.

A single molded electrical box serves the needs of three separate sub markets for both new and old work. Thus the box can be molded in high volume using techniques which take advantage of economy of scale, such as an eight cavity mold. The electrical box has a smooth outer mounting wall surface with a plurality of exit holes, such as, for example, three screw fastener exit holes. Inside, on the mounting wall are molded one or more short parallel rails having a particular geometric crossectional configuration, such as two rails, with, for example, a "T" or dovetail crossection (or any other engaging geometrical crossectional shape). A separate mounting block with corresponding mounting slots is slid onto the rails and pushed to the back end of the electrical box. The rails may have any geometric shaped crossectional configuration mating with a corresponding inverse geometric configuration of the mounting slots. Mounting blocks are molded in several varieties, for multiple fasteners, such a pair of fasteners or otherwise, or for single fastener mounting. They have either a single angled screw guide in the middle or a plurality of separate angled screw guides at the distal side edges of the block. When inserted in the electrical box on the rails provided, the mounting block exit hole or holes for the screw fastener or fasteners line up in registration with the center fastener exit hole in the electrical box or with the plurality of outer exit holes on the mounting side of the electrical box. The electrical box also has a plurality of alignment tabs, such as a pair of tabs, molded at right angles to the mounting side for new work; these also act as anti-rotation tabs in case the single screw fastener option is selected. These tabs have break-off perforations for easy removal for old work use.

For nail attachment in new work, nails are inserted across a recess at the top and bottom of the electrical box each nail supported by a molded groove the full width of the box and one or more capturing straps which are molded to capture the opposite surface of the nail shaft thus forming a nail guide which is the equivalent of brackets with holes. While two or more straps are preferable, if a single strap extends longitudinally of a sufficient length, it may also form a nail guide.

These multi-mount electrical boxes are also available in multi-gang embodiments. Boxes with two through six gangs accommodating two through six switches, duplex outlets, or dimmer controls, etc. are illustrated in this invention. Furthermore, these multi-gang boxes require internal conductive elements in some jurisdictions such as Canada to electrically connect all mounting plates together of every device in a box. This is accomplished in these molded plastic boxes by the introduction of a conductive bus at the factory which is inserted and attached so as to electrically connect the device mounting plates of each bay of a multi-gang box by providing a conductor across bays with an orthogonal contact finger at each bay which contacts the underside of the mounting plate as well as the fastening screw for each device.

Multi-mount boxes of this invention are further available in commercial embodiments with metal sections accepting conduit or armored (BX) cable connectors. A robust molded plastic frame with metal walls is more cost effective than a totally metal commercial electrical box. These are typically multi-gang boxes. Two different embodiments of these commercial multi-mount boxes are described. One uses a molded frame with a central molded plastic rib and two L-shaped metal brackets which fit into molded frame recesses on the walls of the central back plastic rib. A second embodiment uses a molded plastic box frame with an open back which accepts a U-shaped metal bracket which encloses portions of either the top, bottom and/or the entire back of the electrical box. While any shape of metal section (such as a rectangular plate) incorporating mounting holes for conduit or armored cable connectors can be used with plastic frames, it is advantageous to use L or U-shaped metal brackets since the bend or bends afford more structural rigidity. The embodiment using a pair of L-brackets is preferred since it uses less metal than the u-shaped bracket embodiment. The internal bus bar with extending fingers as used in the all-plastic boxes is also compatible with these plastic/metal embodiments to comply with jurisdictional requirements or codes.

BRIEF DESCRIPTION OF THE DRAWINGS

The present invention can best be understood in connection with the accompanying drawings. It is noted that the invention is not limited to the precise embodiments shown in drawings, in which:

FIG. 1 is a perspective view of a molded electrical box of this invention;

FIG. 2 is a perspective view of a two fastener mounting block, a single fastener mounting block, two mounting rails with "T" crossection, and two mounting rails with a dovetail crossection;

FIG. 3 is an end view of a rail with a "T" crossection;

FIG. 4 is an end view of a rail with a dovetail crossection;

FIG. 12 is a perspective view of a 6-gang multi-mount box with optional internal bus bar for electrically connection the mounting flanges of all mounted devices;

FIG. 13 is a top view detail of the contact pad of each conductive extension from the internal bus bar;

FIG. 14 is a perspective view of a 4-gang multi-mount box with internal bus from a lower viewpoint than FIG. 12;

FIG. 15 is a perspective view of the box of FIG. 14 showing the bent-over locating feature of the contact pad of FIG. 13;

FIG. 20 is a perspective detail showing the molded guide elements and molded pins emerging from holes in the top edges of both metal L-brackets;

FIG. 21 is a perspective view of a commercial multi-mount box using a single U-shaped metal bracket;

FIG. 22 is a perspective view of a molded plastic frame with no back for use with a U-shaped metal bracket;

FIG. 23 is an internal perspective view of a commercial multi-mount 6-gang box using a pair of L-brackets and an internal bus bar, and, FIG. 24 is an external perspective view of the box of FIG. 23.

DETAILED DESCRIPTION OF THE INVENTION

Figure 5:
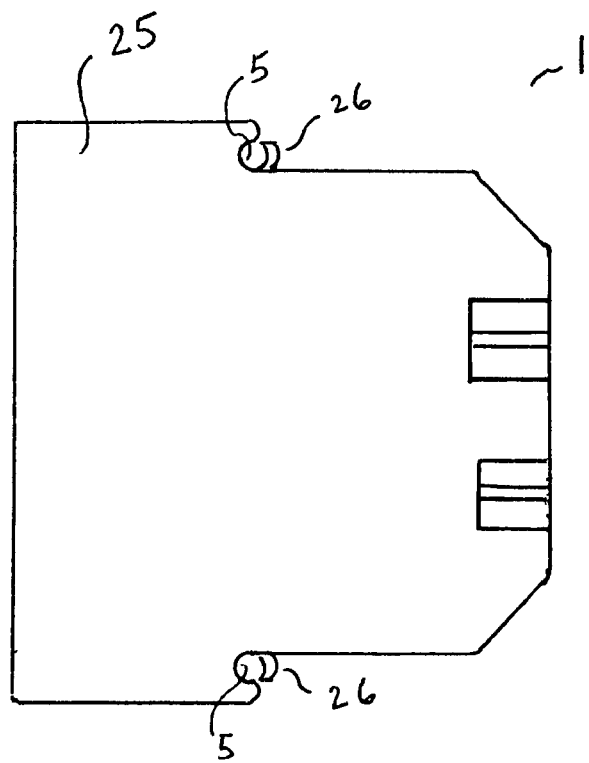
FIG. 5 is a non-mounting side view of the molded electrical box showing nail groove and straps which form nail guides.

The present invention has broad applications to many new work and old work electrical boxes of varying configurations. For illustrative purposes only, a preferred mode for carrying out the invention is described herein the drawing Figures.

Molded multi-mount electrical box 1 is shown in FIG. 1. Mounting side 2 has three fastener exit holes, center 3 and two side holes 4. Center hole 3 is used for single fastener attachment wherein alignment tabs 6 also double as anti-rotation tabs for new work applications. The two side holes 4 would be used for two-fastener screw attachment. Also seen in this view is one end of grooves 5 which support attachment nails (if used). This box will accommodate all three attachment methods with appropriate accessories. Tabs 6 are removed for old work applications.

FIG. 2 shows two-fastener mounting block 10 with dual angled screw guides 11 and mounting slots 12. Also shown is single fastener mounting block 15 with single angled screw guide 11 and mounting slots 12. Either of these mounting blocks 10 or 15 is mounted on the inside of mounting wall 2 of electrical box 1 on a pair of "T" crossection rails 18 (see FIG. 3) or on a pair of dovetail rails 20 (see FIG. 4) which are integrally molded on the inside surface of wall 2. The holes in the angled guides 11 are in positional registration with either exit hole 3 or holes 4 in wall 2 when slots 12 pushed in to the full extent onto rails 18 or 20.

Figure 6:
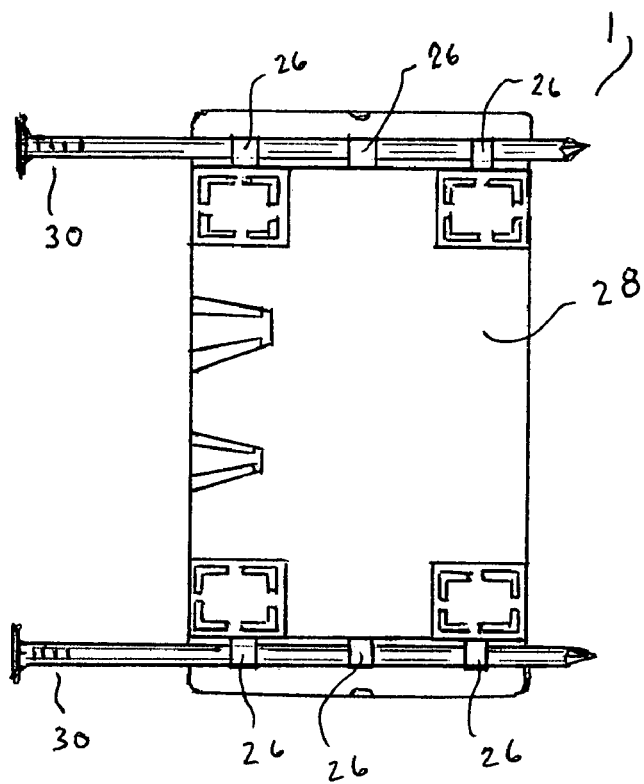
FIG. 6 is a back elevation showing nails mounted on electrical box.

FIGS. 5 and 6 illustrate the use of fastening nails with electrical box 1. Non-mounting side 25 is shown in FIG. 5 with nail groove 5 and mounting straps 26 forming a transverse nail guide to accept nails 30, as shown in back view FIG. 6. The back 28 of electrical box 1 is shown extending from nails 30 each captured by three molded strap members 26. While FIG. 6 shows one example depicting, for example, three straps 26, it is noted that any number of straps 26, such as one or more straps 26, may be used to capture nail 30.

FIGS. 7-11 illustrate multi-gang electrical boxes of this invention with several multi-mount features.

Figure 7:
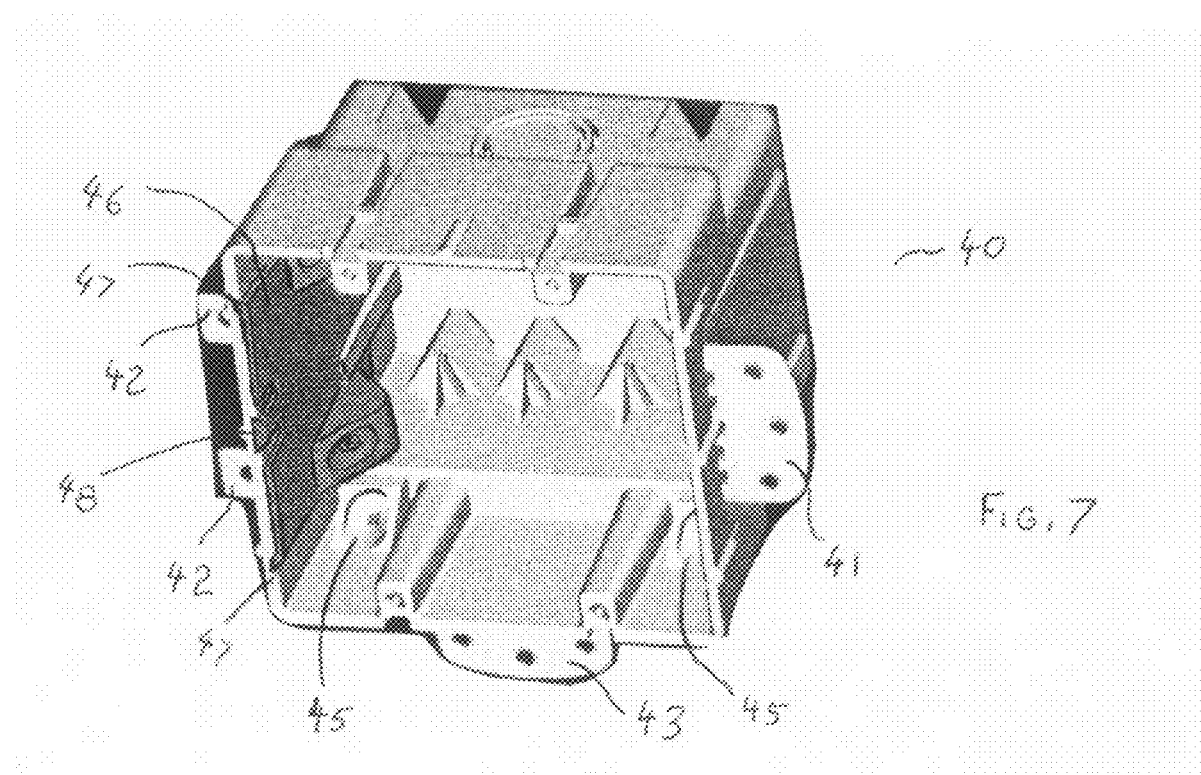
FIG. 7 is a perspective view of a 2-gang multi-mount electrical box of this invention.

FIG. 7 shows a 2-gang box 40 with recessed removable external flanges 42 for single fasteners and flange 41 for three fasteners. Flange 43 at the edge of the open area has three fastener holes for mounting to wallboard. Internal angled guides 45 permit attachment using internal screws at that side. Additionally, a two-fastener slide-in plate 46 for two fasteners is shown at the left side where it slides in on molded side recesses 47 and central molded recess 48.

Figure 8:
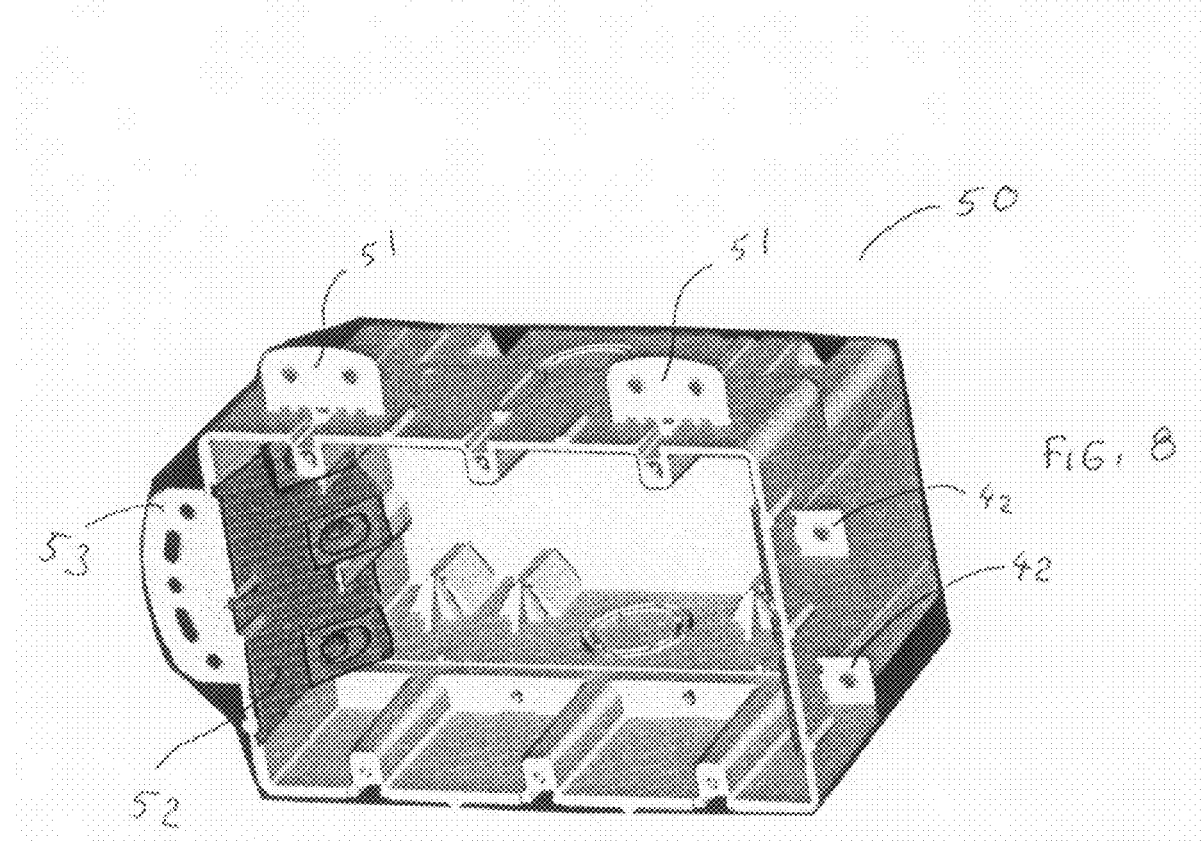
FIG. 8 is a perspective view of a 3-gang multi-mount box.

FIG. 8 shows 3-gang box 50 with 2-hole break-off recessed external flanges 51 and wallboard mounting flange 53. Internally, slide-in plate 52 permits attachment by 3 internal screws.

Figure 9:
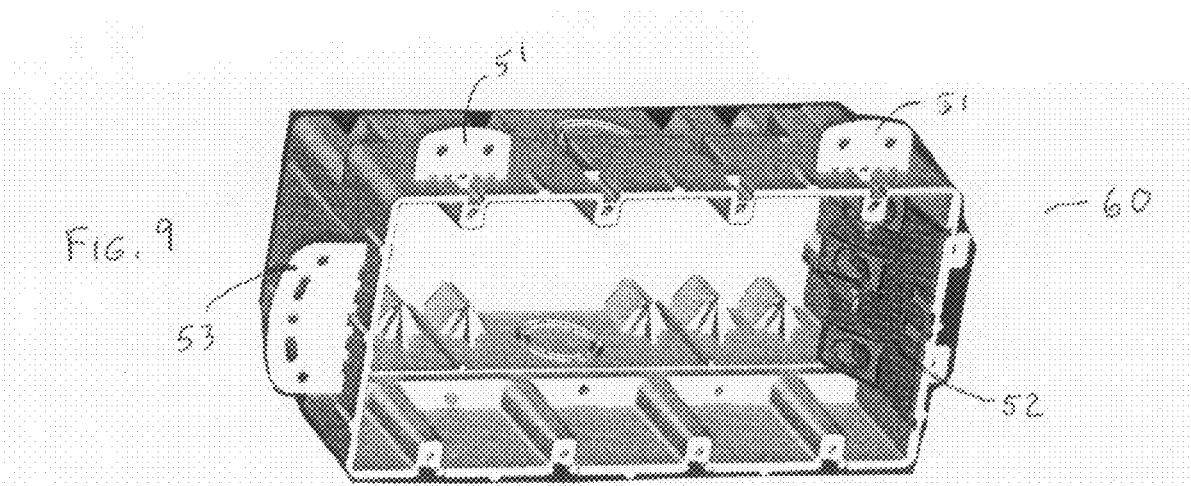
FIG. 9 is a perspective view of a 4-gang multi-mount box.
Figure 10:
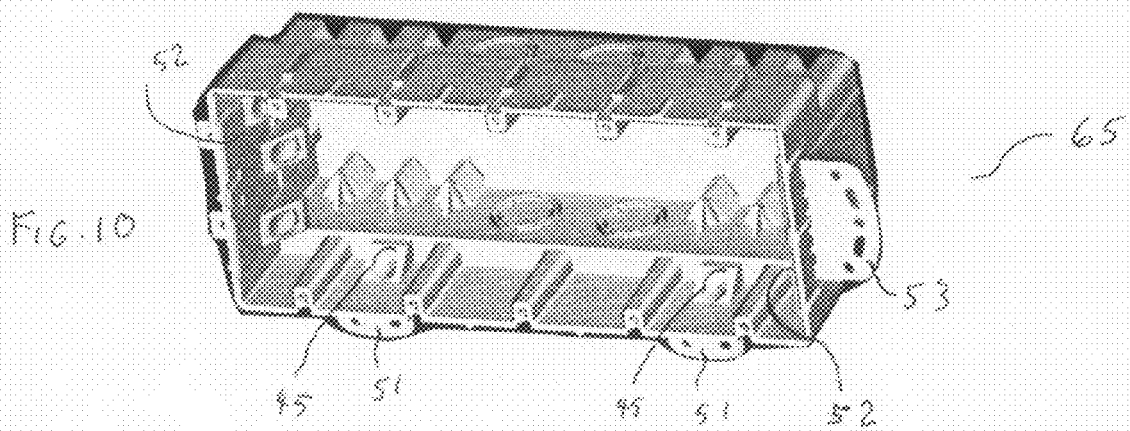
FIG. 10 is a perspective view of a 5-gang multi-mount box.
Figure 11:
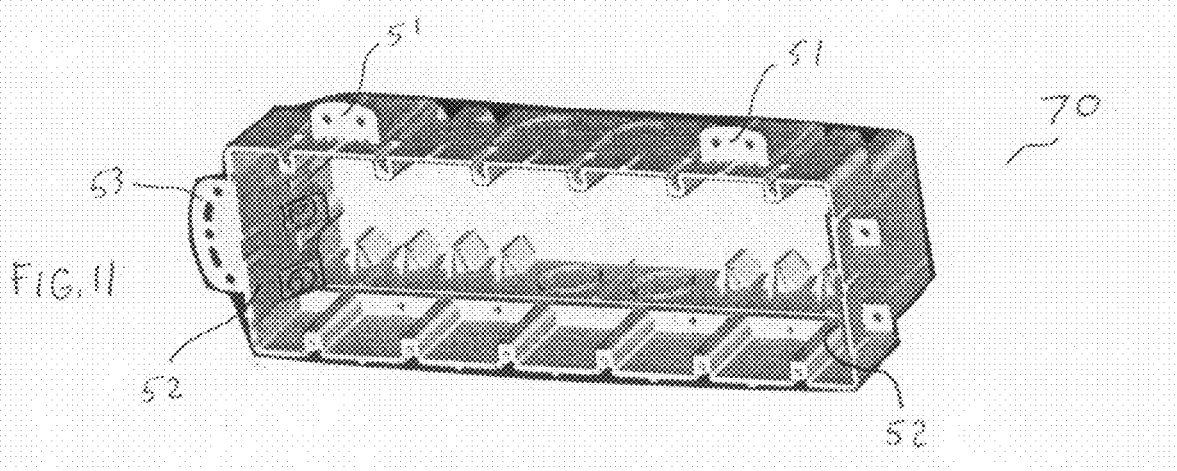
FIG. 11 is a perspective view of a 6-gang multi-mount box.

FIGS. 9-11 illustrate 4-gang box 60, 5-gang box 65, and 6 gang box 70 with similar mounting features.

When a metal multi-gang box is used, all switch or outlet mounting flanges are guaranteed to be at the same potential since the flanges contact the edge of the box and are fastened via a metal screw to a conductive box. In some jurisdictions, such as in Canada, this connection among mounted devices is a requirement. To facilitate this restriction while using a non-conductive molded plastic electrical box, this invention uses an internal 76 bus with several features as shown in FIG. 12. Bus element 80 from bay to bay is seen with extensions or fingers 77 rising to the mounting level of the devices in the 6-gang box 75. Bent-over contact pads 78 touch the underside of any device flange mounted in a bay.

FIG. 13 shows a top view detail of one of pads 78. X-shaped punch-out 84 is centered over fastener hole 85. Note that four points from pad punch-out 84 intrude into mounting hole 85 so that they would contact the metal screw when it is used to mount a device flange. Note that bus 76 is attached internally to box 75 to molded ledge 79 via mounting flanges 81; plastic rivets or heat staked molded pins as shown complete the actual attachment.

FIGS. 14 and 15 show two views of 4-gang box 90 with a four extension 77 internal bus.

In FIG. 15 the bent over end 91 of each pad 78 can be seen as located in a molded recess; this keeps pad 78 from moving during the application of the mounting screw.

Commercial multi-mount boxes with metal brackets to accept connectors for conduit or armored cable (BX) are also part of this invention. Using a sturdy molded plastic frame with metal brackets is a cost-effective to manufacture these electrical boxes.

Figure 16:
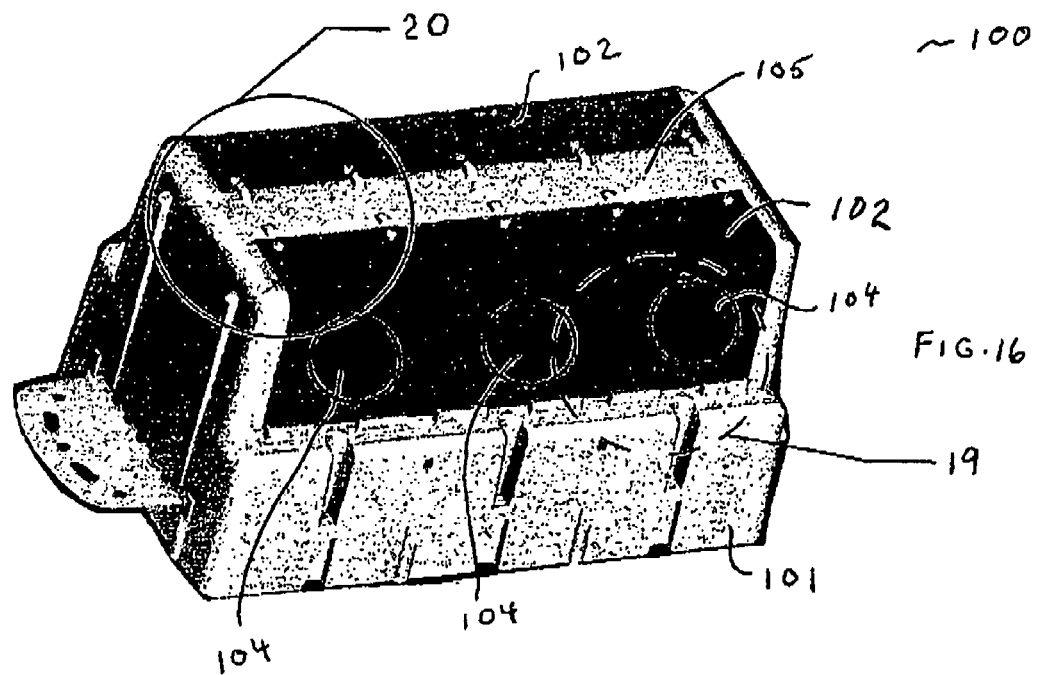
FIG. 16 is a perspective view of a commercial multi-mount electrical box with two L-shaped metal brackets.

FIG. 16 shows 3-gang box 100 using molded frame 101 with two L-shaped metal brackets 102.

Although FIGS. 16-22 illustrate 3-gang boxes, any number of gangs can be implemented while not deviating from the features described. One knockout 14 for each bay on each bracket 102 is shown to accept the conduit or BX connector. Central molded back rib 105 provides a support for brackets 102.

Figure 17:
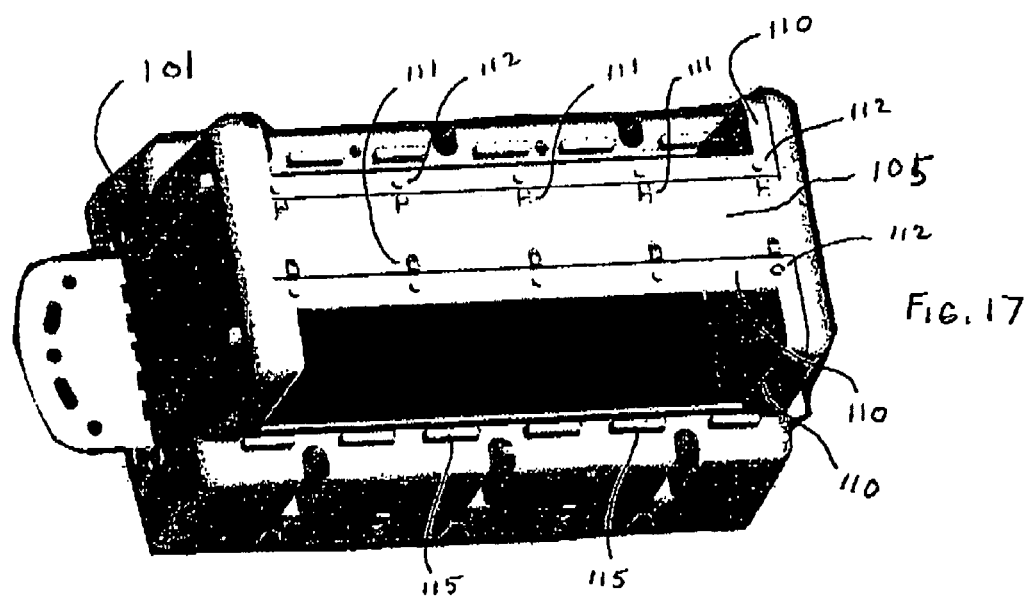
FIG. 17 is a perspective view of the molded plastic frame of the box of FIG. 16.

FIG. 17 shows the molded frame 101 before brackets 102 are installed.

Figure 18:
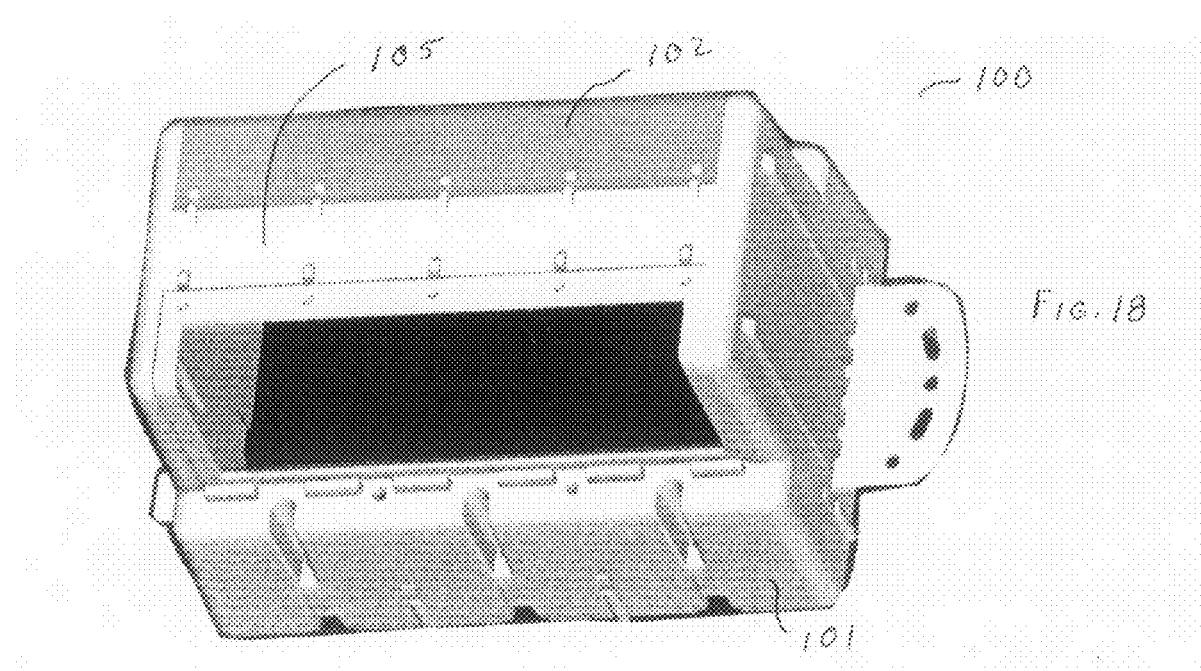
FIG. 18 is a perspective view of the box of FIG. 16 with one L-shaped metal bracket removed.

FIG. 18 shows one of the two brackets 102 installed. Note the frame 101 features in FIG. 17; recessed molded frames 110 support the edges of brackets 102. Molded guides 111 with molded protruding pins 112 along rib 115 (see detail of FIG. 20) combine to guide brackets 102 and to lock them in place when slid down so that pins 112 are inserted through holes in brackets 102. Heat staking of the ends of pins 112 after insertion through brackets 112 can also be used to further insure fastening.

Figure 19:
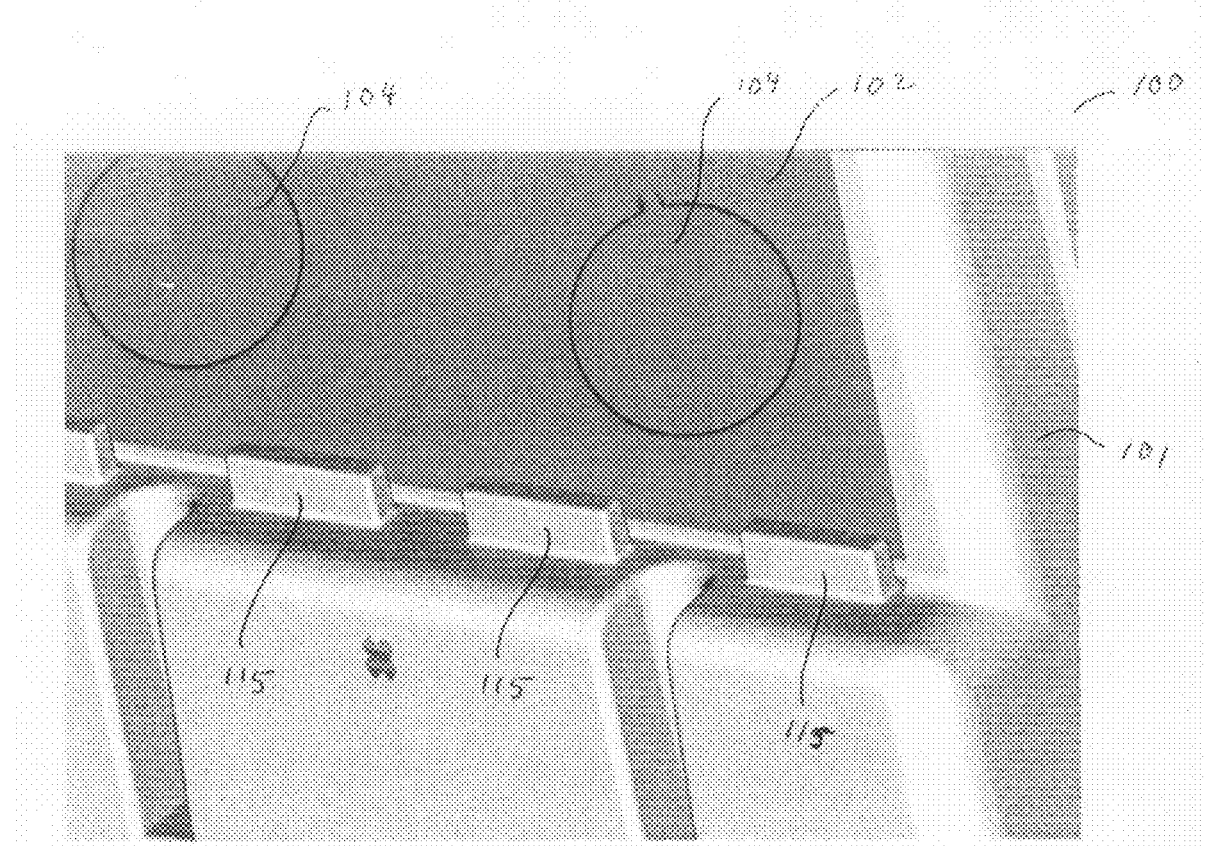
FIG. 19 is a perspective detail showing the molded piers engaging the bottom edge of a metal L-bracket.

Molded piers 115 are used to retain brackets 102 at the opposite (bottom in views) edge (see detail of FIG. 19).

FIGS. 21 and 22 show an alternate embodiment of commercial multi-mount box. This embodiment of box 120 uses a single U-shaped metal bracket 122 to enclose the top and bottom portions and entire back of molded frame 121. Molded frame recess 122 supports the end edges of U-bracket 122. As in the previous embodiment, lower (in views) edges of bracket 122 are retained by molded piers 115 and upper end edges of bracket 122 are locked in place by molded guides 111 and molded protruded pins 112 now placed along the top end (in views) edges of molded frame 121.

FIGS. 23 and 24 show two views of a six-gang commercial multi-mount box 130 with internal bus bar 80 features. Note that in addition to the finger extensions 77 and contact pads 78, a conductive extension 137 is fastened via fastener 140' over a tab 81 whereas the distal end is attached to conductive crossmember 138 by fastener 141 which also conductively attaches to one of two L-brackets 135. The distal end of member 138 is obscured in FIG. 23, but it extends over a portion of the other L-bracket 135 and is fastened to it via fastener 143 (which end is shown in FIG. 24). In this manner, both L-brackets as well as the mounting plate of any device (socket, switch, control, etc.) in every bay position will be insured to be at the same electrical potential.

While FIGS. 23 and 24 show L-brackets, it is noted that other geometric configurations for the brackets may be used, such as U-shaped brackets or single plane plates, to accommodate commercial wire cables, such as BX cables or MC (metal clad) cables.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended Claims.

I claim:

1. A multi-mount, multi-use electrical box comprising:
first and second side walls, lower and upper walls forming a front opening into said electrical box, and a rear wall;
a mounting block removably mounted along an inner surface of said first side wall, said mounting block having one or more angled screw guides for fastener screws in registry with one or more corresponding exit holes in said first side wall;
one or more rails integrally molded on said inner surface of said first side wall for receiving said mounting block; and
said mounting block having one or more slots for engaging said one or more rails to allow said mounting block to be inserted into said opening of said electrical box as needed, said mounting block being removable.

2. The electrical box of claim 1 in which at least one of said side walls has one or more alignment tabs mounted on an outer surface thereof.

3. The electrical box of claim 2 in which said tabs are removable.

4. The multi-mount, multi-use electrical box as in claim 1 wherein said first side wall has multiple exit holes and said mounting block has a pair of angled screw guides for alignment with corresponding said exit holes.

5. A multi-mount, multi-use, molded non-conductive multi gang electrical box comprising: first and second side walls, lower and upper walls forming a front opening into said electrical box, and a rear wall; a mounting block removably mounted along an inner surface of said first side wall, said mounting block having one or more angled screw guides for fastener screws in registry with one or more corresponding exit holes in said first side wall; and one or more rails integrally molded on said inner surface of said first side wall for receiving said mounting block; said mounting block having one or more slots for engaging said one or more rails to allow said mounting block to be inserted into said opening of said electrical box as needed, said mounting block being removable; and one of said lower and upper walls having means for accommodating external attachment fasteners, a bus extending from bay to bay along an internal ledge having orthogonal fingers extending toward said front opening in the center of each of said bay position and bent over into a contact pad to touch an underside of any device flange mounted in said bay, whereby all switch or outlet mounting flanges are guaranteed to be at the same potential, a bent over portion of each said fingers is in a molded recess, said bent portion keeps said pad from moving during the application of a mounting screw.

6. The electrical box of claim 5 in which a ledge is formed on each of inner surfaces of said lower and upper wails, said each ledge having one or more pins to engage mounting holes of attached mounting flanges for securing said bus to said box.

* * * * *